(12) United States Patent
Ishihara et al.

(10) Patent No.: US 7,865,283 B2
(45) Date of Patent: Jan. 4, 2011

(54) VEHICLE STEERING SYSTEM

(75) Inventors: Atsushi Ishihara, Yamatokoriyama (JP); Masanori Arima, Nara (JP); Naoki Maeda, Kashihara (JP); Kosuke Yamanaka, Kashiwara (JP); Tatsuma Kouchi, Kashiwara (JP); Shingo Maeda, Kashiwara (JP); Takeshi Ueda, Kashiba (JP); Daisuke Maeda, Kashiwara (JP)

(73) Assignee: JTEKT Corporation, Osaka-shi (JP)

( * ) Notice: Subject to any disclaimer, the term of this patent is extended or adjusted under 35 U.S.C. 154(b) by 687 days.

(21) Appl. No.: 11/836,325

(22) Filed: Aug. 9, 2007

(65) Prior Publication Data
US 2008/0051959 A1 Feb. 28, 2008

(30) Foreign Application Priority Data
Aug. 25, 2006 (JP) .............................. 2006-229433

(51) Int. Cl.
*B62D 6/00* (2006.01)
(52) U.S. Cl. ....................................................... 701/41
(58) Field of Classification Search .................... 701/41
See application file for complete search history.

(56) References Cited
U.S. PATENT DOCUMENTS 4,300,081 A * 11/1981 Van Landingham ......... 318/599
5,467,275 A * 11/1995 Takamoto et al. ............. 701/70
5,726,890 A * 3/1998 Takamoto et al. ............. 701/70
6,072,293 A * 6/2000 Shimizu et al. ............. 318/432
2002/0007236 A1* 1/2002 Sadano et al. ................. 701/28
2002/0013647 A1* 1/2002 Kawazoe et al. .............. 701/41
2002/0016657 A1* 2/2002 Iwazaki ....................... 701/41

FOREIGN PATENT DOCUMENTS

| DE | 44 45 561 A1 | 6/1995 |
| JP | 10-114272 | 5/1998 |
| JP | 2004-284530 | 10/2004 |
| JP | 2006-21722 | 1/2006 |

OTHER PUBLICATIONS

U.S. Appl. No. 11/758,902, filed Jun. 6, 2007, Maeda et al.
U.S. Appl. No. 11/760,402, filed Jun. 8, 2007, Maeda et al.
U.S. Appl. No. 11/760,311, filed Jun. 8, 2007, Arima et al.
U.S. Appl. No. 11/760,206, filed Jun. 8, 2007, Arima et al.

* cited by examiner

*Primary Examiner*—Thomas G Black
*Assistant Examiner*—Shelley Chen
(74) *Attorney, Agent, or Firm*—Oblon, Spivak, McClelland, Maier & Neustadt, L.L.P.

(57) ABSTRACT

There is provided a vehicle steering system which includes an electric motor for imparting a steering force to a steering mechanism of a vehicle and an automatic parking controller for executing an automatic parking control by controlling the electric motor, wherein the automatic parking controller controls an energizing voltage of the electric motor by imparting a square wave to the electric motor and increasing/decreasing a neutral point voltage of a winding of the electric motor.

2 Claims, 8 Drawing Sheets

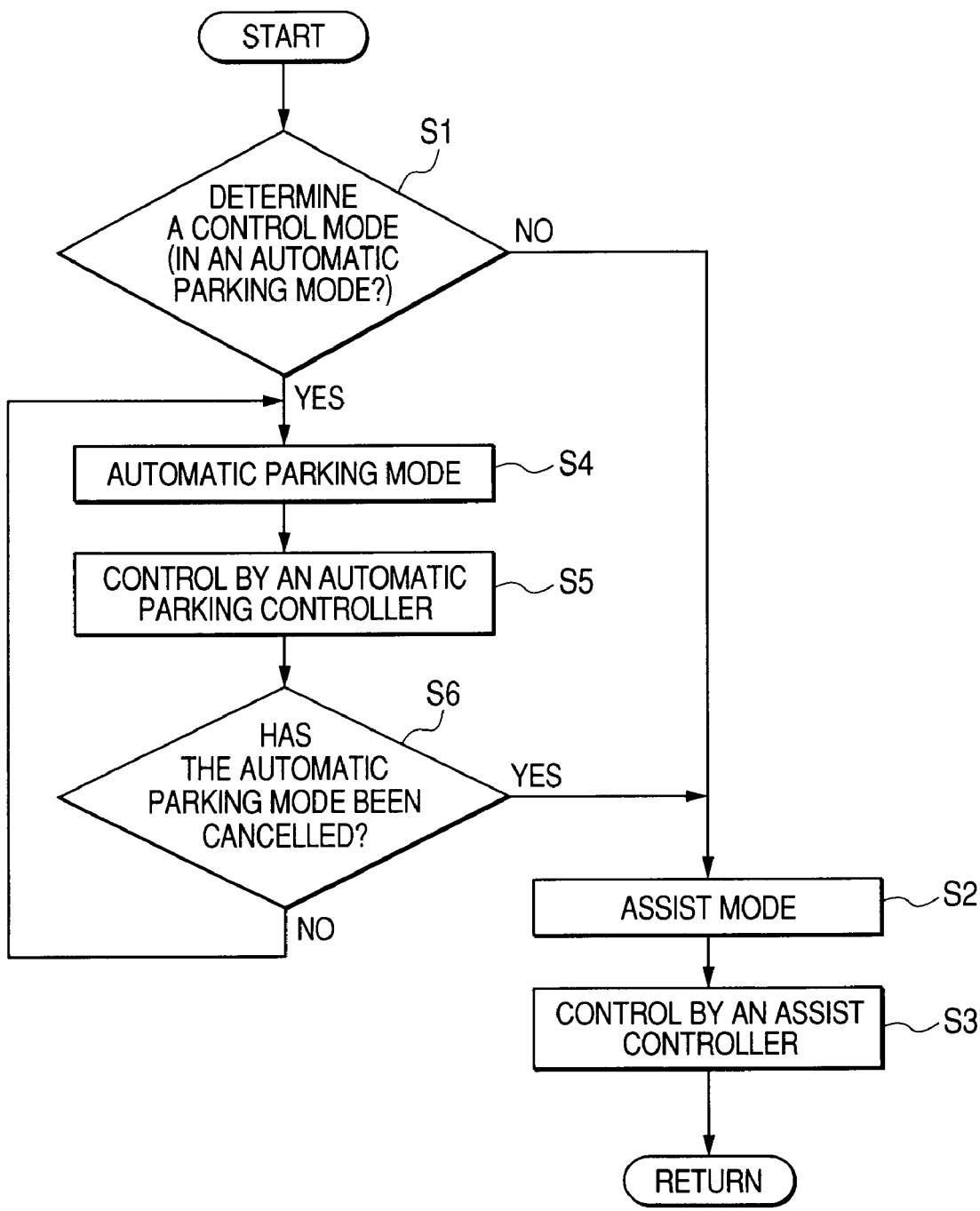

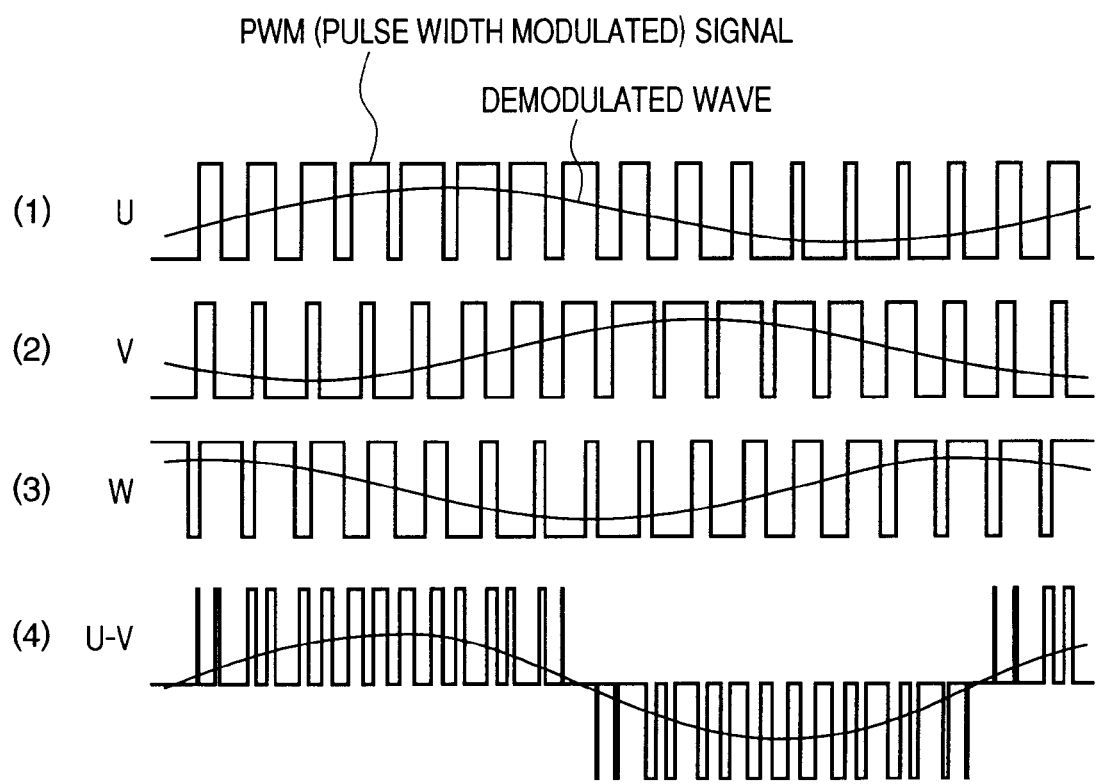

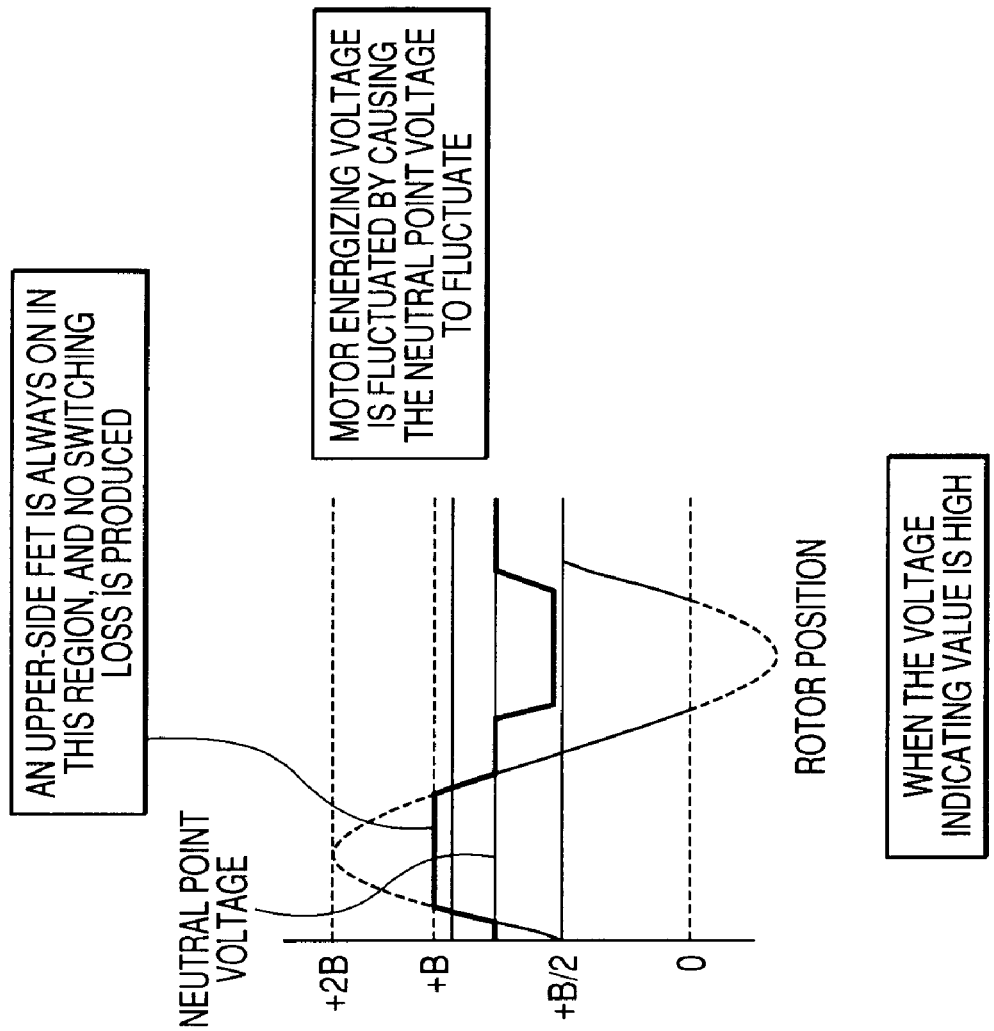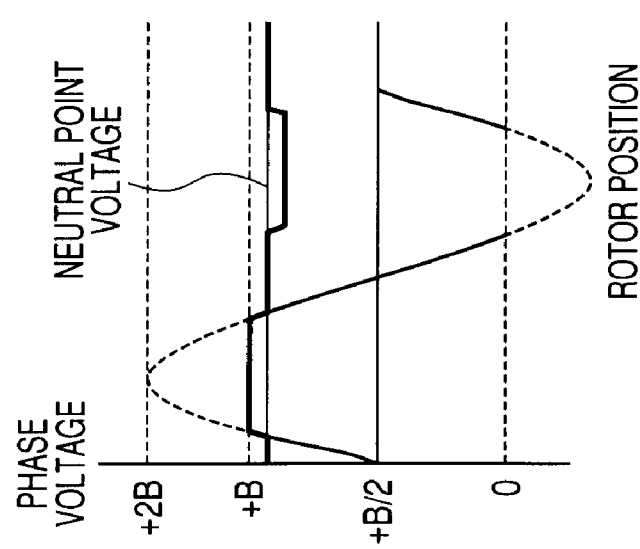

VEHICLE STEERING SYSTEM

This application is based on and claims a priority from a Japanese Patent Application No. 2006-229433 filed on Aug. 25, 2006, the entire contents of which are incorporated by reference.

BACKGROUND OF THE INVENTION

The present invention relates to a vehicle steering system which enables an automatic steering control.

Techniques have been proposed in which a vehicle is automatically steered by making use of a steering actuator installed on the vehicle. For example, a power steering system installed on a vehicle includes an electric motor or a hydraulic actuator as a steering actuator for giving a steering force (a steering assist force) to a steering mechanism. By controlling outputs of these steering actuators, steered road wheels of the vehicle can be turned without relying on the steering operation by the driver.

More specifically, in an automatic parking control, a target traveling path from a current position of the subject vehicle to a parking position is operated, and a relationship of a target steering angle relative to a traveling distance of the vehicle is obtained in such a way that the vehicle can be reversed along the target traveling path so operated. Then, the steering actuator is controlled in such a way as to attain a target steering angle according to the traveling distance of the vehicle. As this occurs, the driver only has to adjust the vehicle speed and control a stopping position by applying the brakes and controlling the accelerator and does not have to perform the steering operation.

Of course, when an obstacle such as a person or other moving object enters the target traveling path after the automatic parking control has been started, the driver can intervene in the automatic parking control by not only applying the brakes but also applying an operating torque to a steering wheel. As this occurs, when it is detected that the operating torque applied to the steering wheel has surpassed a predetermined torque threshold, the automatic parking control is cancelled (JP-A-2004-284530).

In addition, there is also proposed a technique in which an automatic parking control is cancelled when the driver operates the steering wheel or releases his or her foot from the brake pedal during automatic parking control. Namely, when there is an intervention in the automatic parking control by the driver operating the devices, the automatic parking control is cancelled without any delay (JP-A-10-114272).

On the other hand, there is also proposed a technique in which an intervention by the driver operating the devices is permitted during automatic parking control, and when there is caused a fear that the operation by the driver brings the vehicle into contact with an obstacle, a control is performed which makes it difficult for the operation attempted by the driver to occur (JP-A-2006-21722).

In the conventional automatic parking controls, in general, the driver does not have to operate the steering wheel, and turning the steered road wheels of the vehicle is attained automatically by the steering actuator. Because of this, the driver is not placing his or her hands on the steering wheel during automatic parking control.

Nevertheless, also in the automatic parking control, the driving control which is similar to that executed during assist control is adopted conventionally as the driving control of the steering actuator, and from the viewpoints of making the control highly efficient and saving energy necessary for the control, there has been left a sufficient room for improvement.

SUMMARY OF THE INVENTION

The invention has been made based on the background mentioned heretofore, and a principal object thereof is to provide a vehicle steering system which can make the driving control of the steering actuator highly efficient during automatic steering control, so as to realize the energy saving.

The other object of the invention is to provide a vehicle steering system which can switch ways of controlling the driving of an electric motor as a steering actuator between during manual steering and during automatic steering control, so that the electric motor can be made to be operated highly efficiently and in an energy saving fashion during automatic steering control.

With a view to attaining the objects, according to a first aspect of the invention, there is provided a vehicle steering system including a steering actuator (M) for giving an steering force to a steering mechanism (1) of a vehicle and an automatic steering controller (22) for controlling the steering actuator (M) to thereby perform an automatic steering control, wherein the automatic steering controller executes a driving control of the steering actuator (M) by a specific driving control which differs from a driving control executed at the time of manual steering. Note that parenthesized numerals represent corresponding constituent elements in an embodiment which will be described later in this specification. This will also be true in the following description.

According to a second aspect of the invention, the steering actuator (M) can be realized by an electric motor (M) having windings of at least three phases. The automatic steering controller controls a phase current by causing a PWM duty of a certain phase to become 100% according to an electrical angle and applying an interphase voltage with employing an upper limit voltage thereof as a reference.

According to this configuration, in the phase in which 100% of the PWM duty is applied to the electric motor as the steering actuator (M), there is caused no switching loss that would otherwise be caused when energizing voltages of the electric motor are switched, thereby making it possible to control the electric motor highly efficiently. As a result, the way of controlling the electric motor during the automatic steering can be realized in which the electric motor is controlled highly efficiently and in an energy saving fashion.

According to a third aspect of the invention, there is provided a vehicle steering system as set forth in the first or second aspect of the invention, having a setting switch (13) which is manually operated to set the automatic steering control, wherein a control by the automatic steering controller (22) is executed as a result of the automatic steering control being set by the setting switch (13).

According to this configuration, when the driver manually operates the setting switch (13), the automatic steering control is put into effect thereafter, and hence, the driver grips on the steering wheel in no case. Consequently, the operation feeling of the steering wheel felt by the driver does not have to be taken into consideration, thereby making it possible to drive the steering actuator (M) in such a way as to realize the high efficiency and energy saving as has been described above.

BRIEF DESCRIPTION OF THE DRAWINGS

FIG. 3 is a flowchart which illustrates switching of controls performed in a microcomputer 20 in the controller between a control by an assist controller 21 and a control by an automatic parking controller 22.

FIG. 4A is a diagram showing the electric motor M and an inverter contained in a driving circuit 30, and FIG. 4B is a waveform diagram which shows a relationship between a phase voltage given to one of windings and a position of a rotor.

FIG. 5 is a graph showing examples of voltage waveforms given to respective phases of the electric motor M by a PWM control.

FIGS. 6A and 6B are diagrams which describe a way of applying a voltage to the electric motor M which is performed by the automatic parking controller 22 in an automatic parking mode, FIG. 6A is a graph showing a relationship between a phase voltage and a position of a rotor when a voltage indicating value is low, and FIG. 6B is a graph showing a relationship between the phase voltage and the position of the rotor when the voltage indicating value is high.

FIG. 7A is a graph showing a relationship between a phase voltage and a position of a rotor when a voltage indicating value is high, and FIG. 7B is a graph showing a relationship between the phase voltage and the position of the rotor when the voltage indicating value is low.

DETAILED DESCRIPTION OF PREFERRED EMBODIMENTS

Hereinafter, an embodiment of the invention will be described in detail by reference to the accompanying drawings.

Figure 1:
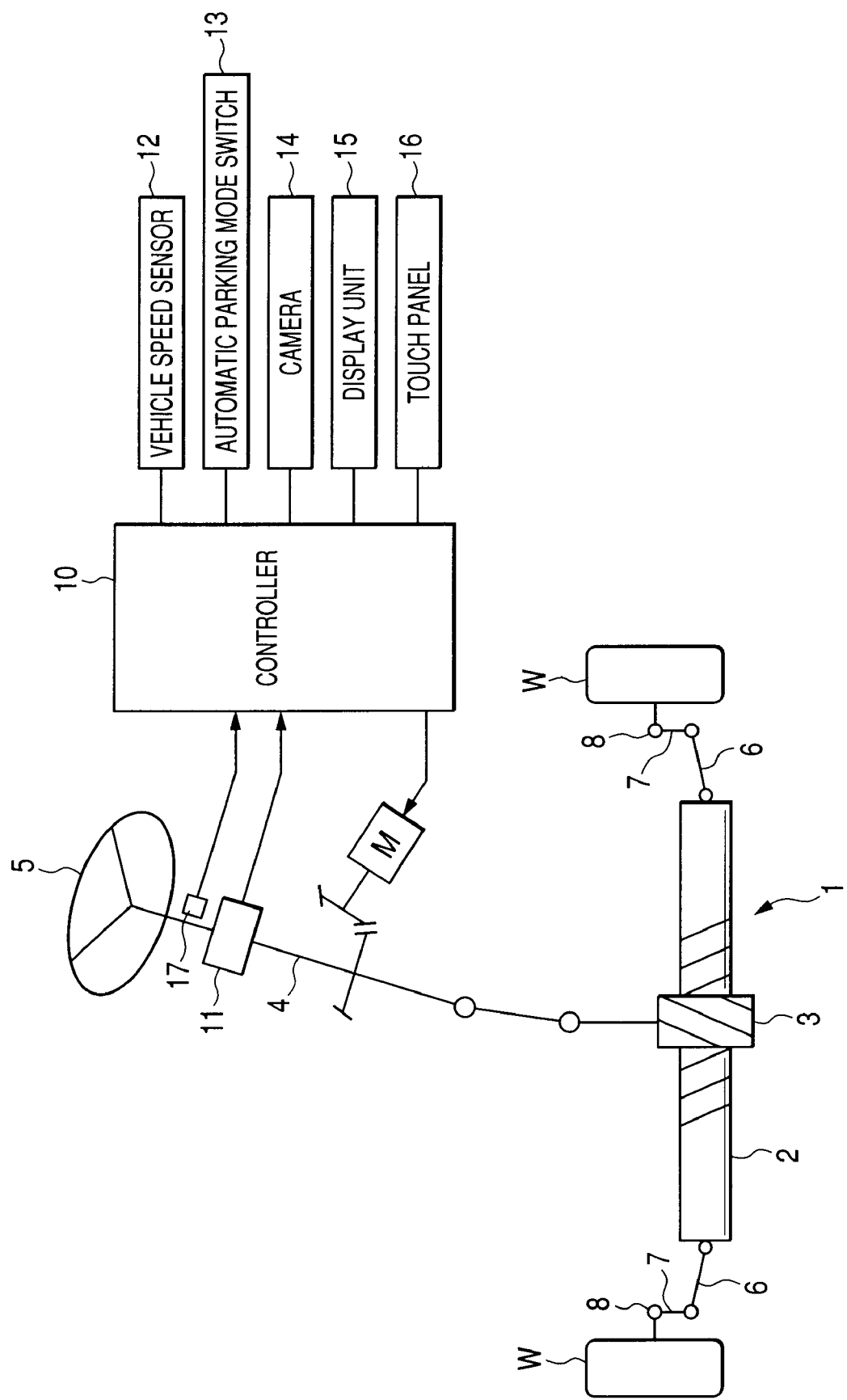
FIG. 1 is a conceptual diagram which describes the configuration of an electric power steering system which is an embodiment of a vehicle steering system of the invention.

FIG. 1 is a conceptual diagram which describes the configuration of an electric power steering system which is an embodiment of a vehicle steering system of the invention. This electric power steering system is configured such that torque generated by an electric motor M as a steering actuator is transmitted to a steering mechanism 1 for turning steered road wheels W (for example, front left and right road wheels) of a vehicle. The steering mechanism 1 is a rack-and-pinion type steering mechanism made up of a rack shaft 2 which extends along a transverse direction of the vehicle and a pinion 3 adapted to mesh with a rack on the rack shaft 2. One end of a steering shaft 4 is connected to the pinion 3, and a steering wheel 5 is connected to the other end of the steering shaft 4. Consequently, by operating rotationally the steering wheel 5, the rotation thereof is transmitted to the rack shaft 2 via the steering shaft 4 and the pinion 3, so as to be converted into an axial displacement of the rack shaft 2.

A pair of tie rods 6 are connected to opposite ends of the rack shaft 2 at one end thereof, respectively. The pair of tie rods 6 are connected to ends of a pair of knuckle arms 7 at the other end thereof, respectively. The pair of knuckle arms 7 are supported rotatably round a pair of king pins 8, respectively, so as to be connected to the pair of steering road wheels W. By adopting this configuration, when the rack shaft 2 is displaced in an axial direction, the knuckle arms 7 rotate round the king pins 8, respectively, whereby the steered road wheels W are turned.

A controller (ECU: Electronic Control Unit) 10 for controlling the electric motor M is provided to impart an appropriate steering force to the steering mechanism 1. An output signal of a torque sensor 11 for detecting a steering torque applied to the steering wheel 5, an output signal of an operation angle sensor 17 for detecting an operation angle of the steering wheel 5 by detecting a rotational angle of the steering shaft 4 and an output signal of a vehicle speed sensor 12 for detecting a vehicle speed of the vehicle on which the electric power steering system is installed are made to be inputted into the controller 10. An output of an automatic parking mode switch 13 for setting and canceling an automatic parking mode is imparted further to the controller 10, and a video signal from a camera 14 for sensing the rear of the vehicle is made to be inputted thereinto. Furthermore, a display unit 15 (for example, a liquid crystal display unit or other image display units) which is disposed in the vicinity of a driver's seat of the vehicle is connected to the controller 10, so that an output signal of a touch panel 16 provided on a display screen of the display unit 15 is made to be inputted into the controller 10.

When the automatic parking mode is instructed to be performed by operating the automatic parking mode switch 13, the controller 10 controls the electric motor M according to the automatic parking mode in which a steering control (an automatic parking control) is performed for automatic parking of the vehicle. In addition, when cancellation of the automatic parking mode is instructed by operating the automatic parking mode switch 13, the controller 10 cancels the automatic parking control and controls the electric motor M according to an assist mode. The assist mode is a control mode for generating a steering assist force for assisting the driver to steer the vehicle from the electric motor M based on an operation torque detected by the torque sensor 11 and a vehicle speed detected by the vehicle speed sensor 12.

Figure 2:
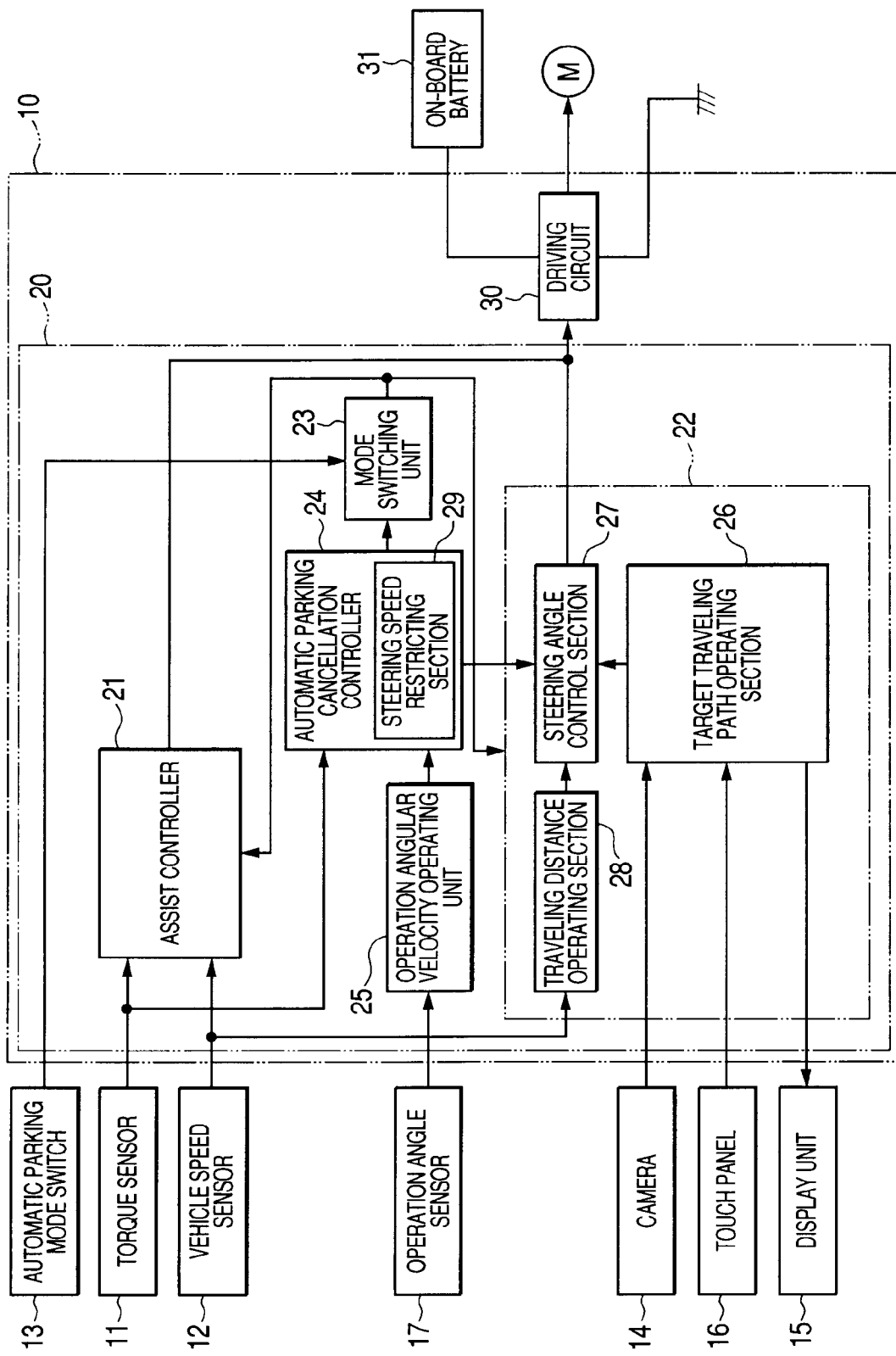
FIG. 2 is a block diagram which describes an electrical configuration of a controller provided on the vehicle steering system.

FIG. 2 is a block diagram which describes an electrical configuration of the controller 10. The controller 10 includes a microcomputer 20 and a driving circuit 30 for supplying electric power from an on-board battery 31 to the electric motor M.

The microcomputer 20 includes a CPU (Central Processing Unit) and memories (ROM, RAM and the like) and has functions as a plurality of functioning units by executing predetermined programs. The plurality of functioning units include an assist controller 21 for controlling the electric motor M according to the assist mode, an automatic parking controller 22 for controlling the electric motor M according to the automatic parking mode, a mode switching unit 23 for performing switching between the automatic parking mode and the assist mode, an automatic parking cancellation controller 24 for canceling an automatic parking control by the automatic parking controller 22 when a predetermined condition is established so as to shift the mode from the automatic parking mode to the assist mode, and an operation angular velocity operation unit 25 for operating an operation angular velocity which is a time differential value of an operation angle which is outputted by the operation angle sensor 17.

The mode switching unit 23 selects a control by either of the assist controller 21 and the automatic parking controller 22 so as to make the selected control effective, whereby the automatic parking mode is switched to the assist mode or vice versa. In addition to switching the control mode according to the setting by the automatic parking mode switch 13, the mode switching unit 23 switches the control mode from the automatic parking mode to the assist mode in response to an instruction from the automatic parking cancellation controller 24 when in the automatic parking mode.

The automatic parking cancellation controller 24 determines whether or not the automatic parking mode is to be cancelled based on the operation torque detected by the torque sensor 11 and the operation angular velocity which is operated by the operation angular velocity operation unit 25. When the automatic parking mode is determined to be cancelled, the automatic parking cancellation controller 24 gives to the mode switching unit 23 an automatic parking cancellation instruction which indicates that the automatic parking mode is to be cancelled.

In addition, the automatic parking cancellation controller 24 has a steering speed restricting section 29 for restricting the steering speed by the automatic parking control when in the automatic parking mode. This steering speed restricting section 29 determines whether or not it should intervene in the automatic parking control by the automatic parking controller 22 based on the operation angular velocity and the steering torque and gives a command to intervene in the automatic parking control to the automatic parking controller 22 as required.

The assist controller 21 determines a motor target current value which corresponds to an operating torque detected by the torque sensor 11 and a vehicle speed detected by the vehicle speed sensor 12. More specifically, the assist controller 21 sets a motor target current value according to assist characteristics in which motor target current values are determined in accordance with operating torques and vehicle speeds and drive controls the electric motor M via the driving circuit 30 in such a way that the motor target current value so set is attained. The assist characteristics are stored in the memory within the microcomputer 20 in the form of, for example, a map (a table). According to the assist characteristics, it is determined, for example, that the larger an absolute value of the operating torque becomes, the larger the motor target current value is set, while the larger the vehicle speed becomes, the smaller the motor target current value is set.

The automatic parking controller 22 includes a target traveling path operating section 26 for operating a target traveling path from a current position to a target parking position of the vehicle, a steering angle control section 27 for controlling the steering angle according to a target traveling path operated by the target traveling path operating section 26, and a traveling distance operating section 28 for operating a traveling distance based on an output signal of the vehicle sensor 12.

The target traveling path operating section 26 operates a target traveling path based on an image sensed by the camera 14 and an input from the touch panel 16. For example, when the driver operates the automatic parking mode switch 13 so as to designate the automatic parking mode, an image outputted by the camera 14 is displayed on the display unit 15. The driver designates a desired parking position from the touch panel 16 by referring to the image displayed on the display unit 15. When the parking position is designated in this way, the target traveling path operating section 26 operates a positional relationship between the current position of the subject vehicle and the designated parking position and furthermore, obtains a path which can avoid an obstacle recognized from the image sensed by the camera 14 as a target traveling path. This traveling path so obtained may be displayed on the display unit 15.

The target traveling path operating section 26 stores information on a target traveling path in the memory in the form of steering control table data which is table data showing a relationship between a traveling distance of the vehicle from a current vehicle position and a steering angle which corresponds to this traveling distance. The steering angle control section 27 controls the electric motor M by referring to the steering control table data. Namely, the steering angle control section 27 obtains based on a traveling distance of the vehicle which is inputted from the traveling distance operating section 28 steering angle data which corresponds to the traveling distance. The steering angle control section 27 controls the electric motor M via the driving circuit 30 in such a way that the steering angle data is attained.

In this embodiment, when the steering angle control section 27 controls the electric motor M via the driving circuit 30, a specific drive control is performed in which the electric motor M is square wave driven and a motor energizing voltage (an interphase voltage) is controlled by causing a neutral point voltage to increase/decrease.

FIG. 3 is a flowchart which illustrates switching of controls performed in the microcomputer 20 shown in FIG. 2 between a control by the assist controller 21 and a control by the automatic parking controller 22.

When the microcomputer 20 starts to operate, the microcomputer 20 first determines on the control mode (step S). The determination of the control mode is implemented by determining whether or not the automatic parking mode switch 13 has been operated (refer to FIG. 2). If the automatic parking mode switch 13 has not been operated, the microcomputer 20 determines that the control mode is the assist mode (step S2), and the operation of the electric motor M is controlled by the assist controller 21 via the driving circuit 30 (step S3).

On the other hand, if the automatic parking mode switch 13 has been operated, the microcomputer 20 determines that the control mode is the automatic parking mode (step S4), and the electric motor M is driven by the automatic parking controller 22 via the driving circuit 30 (step S5). Then, the microcomputer 20 determines whether or not the automatic parking mode has been cancelled during the automatic parking mode (step S6). If the automatic parking mode has been canceled, the microcomputer 20 switches the control mode from the automatic parking mode to the assist mode.

Figure 4A:
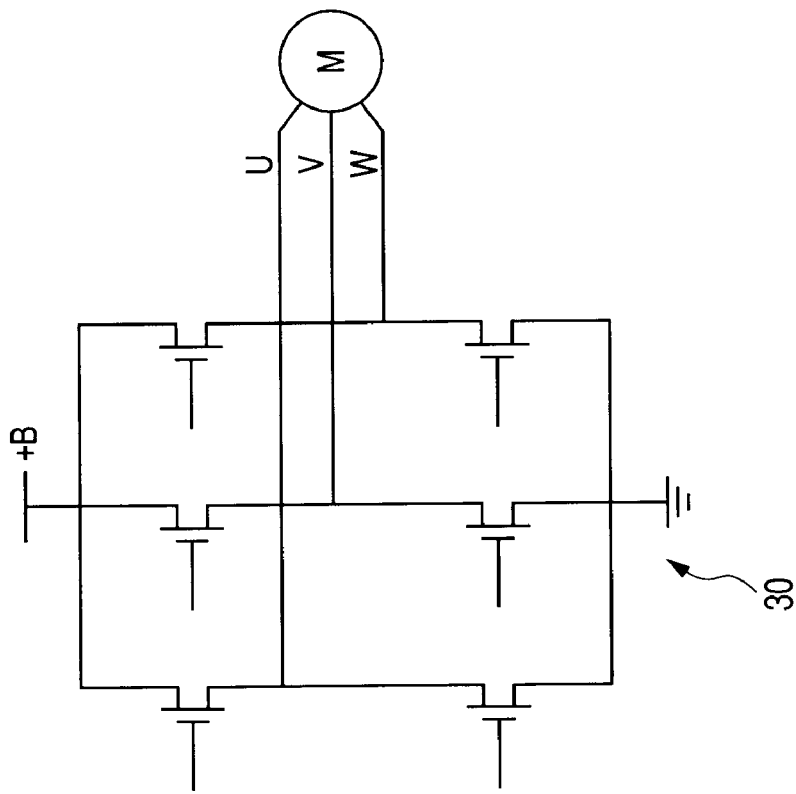
FIGS. 4A and 4B are illustrations which describe an energizing control of an electric motor M in an assist mode.
Figure 4B:
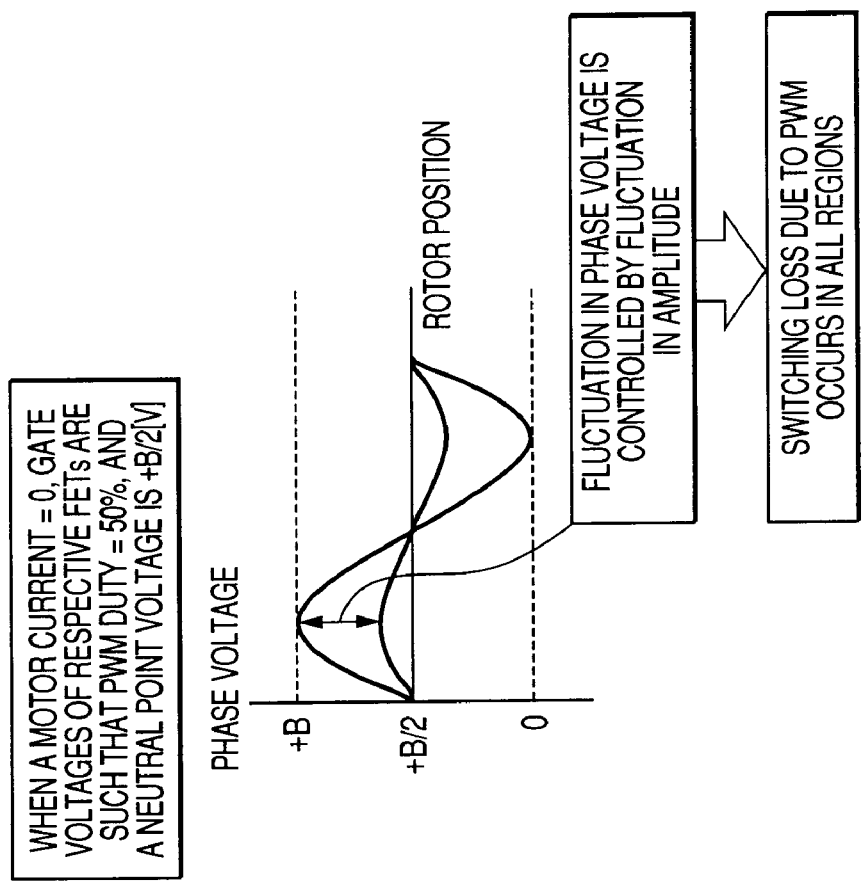

FIG. 4A is a diagram which shows the electric motor M having three phase windings (U, V, W) and an inverter which is contained in the driving circuit 30 for the electric motor M and FIG. 4B is a waveform diagram which shows a relationship between a voltage (a phase voltage) given to one of the windings and a rotor position of the electric motor M.

Referring to FIGS. 4A and 4B, in the event that the current of the electric motor M is zero, gate voltages of respective FETs of the inverter are a neutral point voltage (+B/2[V]) with a PWM duty ratio made to be 50%, and when a motor current is caused to flow, a phase voltage is applied based on this neutral point voltage.

Namely, at the time of assist mode, the increasing and decreasing of the phase voltage of the electric motor is controlled based on the increasing and decreasing of amplitude by the assist controller 21. Because of this, in voltages given to the gates of the respective FETs of the inverter, switching loss due to PWM is caused in all regions.

More specifically, voltages given to U-phase, V-phase and W-phase windings of the motor are so given in sine wave forms shown in (1) to (3) of FIGS. 5 by the gate voltages of the respective upper-side FETs shown in FIG. 4A being PWM controlled, whereby an interphase voltage, for example, between the U and V phases becomes a waveform shown in (4) of FIG. 5.

Due to the aforesaid control being performed by the assist controller 21, the driver can perform a steering operation with good operability without having to feel an uncomfortable feeling in operation of the steering wheel in the assist mode.

On the other hand, in the automatic parking mode, as has been described above, basically, the driver keeps his or her hands off the steering wheel 5, and hence, the operation feeling of the steering wheel 5 does not particularly constitute a problem.

Then, in this embodiment, in the automatic parking mode, the automatic parking controller 22 applies voltages as shown in FIGS. 6A and 6B to the electric motor M via the driving circuit 30.

Namely, the automatic parking controller 22 square wave drives the electric motor M and controls a phase current by causing a PWM duty of a certain phase to become 100% according to an electrical angle of the rotor and applying a motor energizing voltage (an interphase voltage) with employing an upper limit voltage thereof as a reference. By adopting this configuration, the upper-side FET of the certain phase of the inverter which energizes the electric motor M shown in FIG. 4A is always in an on state, whereby no switching loss is caused which would otherwise be caused by switching the gate voltages of the upper-side FET.

More specifically, current flows from the on-board battery 31 (refer to FIG. 2) to the respective phases of the electric motor M after having passed through the upper-side FETs of the inverter contained in the driving circuit 30, and the current which has passed through the respective phases passes through lower-side FETs of the inverter to flow the ground potential. In this case, since the upper-side FETs only have to be always turned on in order to square wave drive the electric motor M, no switching loss is produced.

The increasing and decreasing in motor energizing voltage (the interphase voltage) is executed by implementing energization with employing the upper limit voltage as a reference, as can be understood when comparing FIG. 6A showing the case that a voltage indicating value is low and FIG. 6B showing the case that the voltage indicating value is high.

Figure 7A:
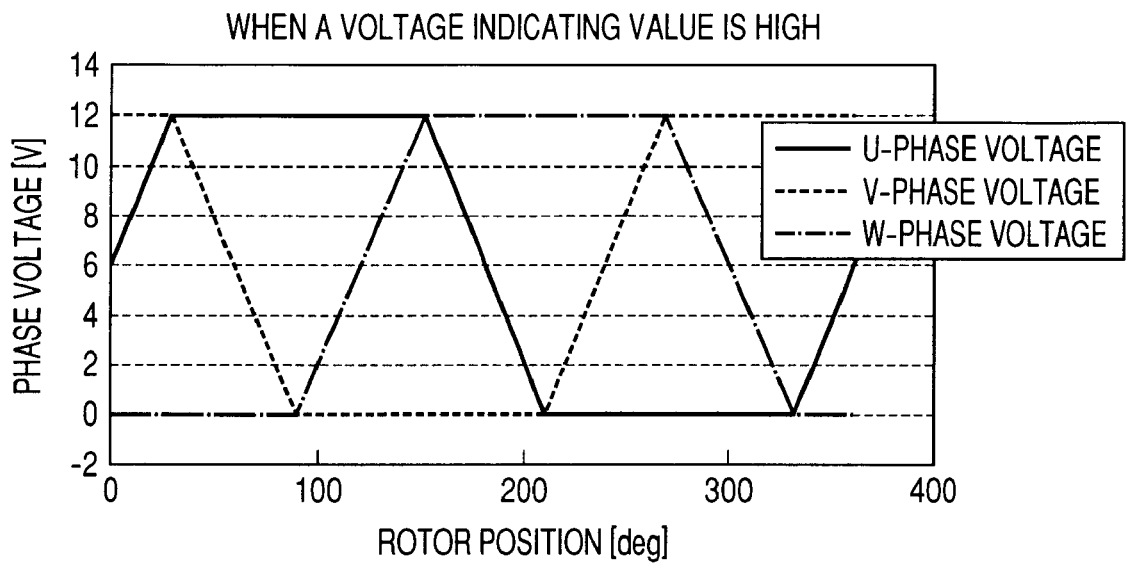
FIGS. 7A and 7B are graphs which describe a way of applying a voltage to the electric motor M which is performed by the automatic parking controller 22 in the automatic parking mode.
Figure 7B:
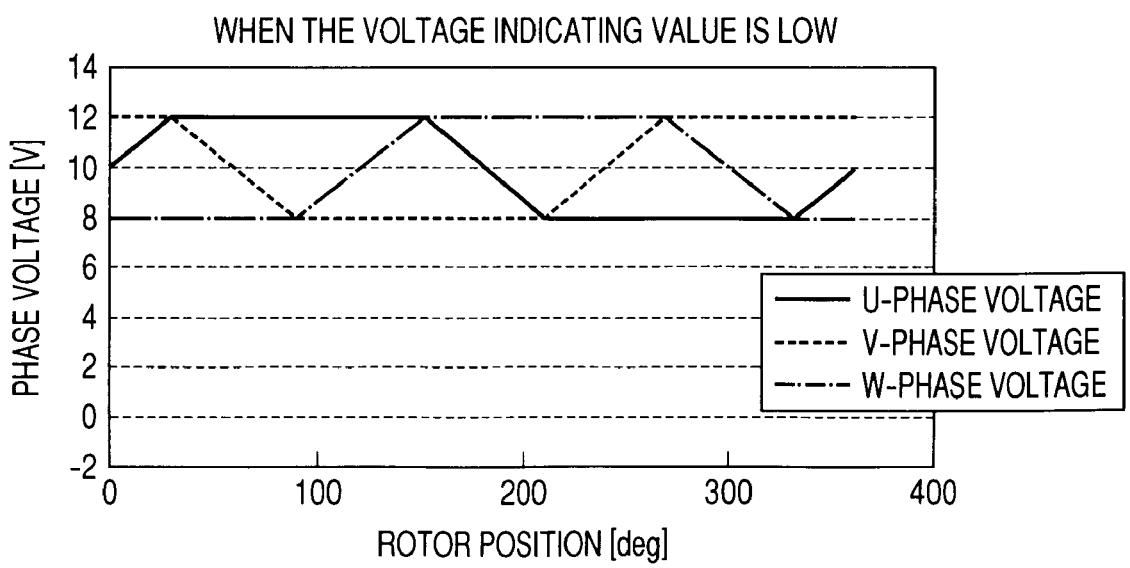

More specifically, as shown in FIGS. 7A and 7B, for example, in a range where the U-phase voltage becomes 12V, the upper-side FET which applies the voltage to the U phase is always on. On the other hand, in the other phases, the respective FETs are controlled by the PWM duty so as to realize predetermined phase voltages. Because of this, when the certain phase voltage is 12V, the corresponding FET is always on, and no switching loss is produced in the relevant phase.

In addition, the energizing voltage is controlled with employing the energizing voltage 12V (the voltage of the on-board battery 31) as the reference, thereby the neutral point voltage is increased/decreased and it is possible to cause the interphase voltage to be increased/decreased.

As a result of the aforesaid control being carried out in the automatic parking mode, the one of upper-side FETs is made to be always on while the voltage of 12V is being applied, and no switching loss is produced in the FET which correspond to the phase to which the voltage of 12V is being so applied. Namely, since no switching loss is produced in the FET when + voltage is applied, the electric motor M can be drive controlled with high efficiency.

Figure 8:
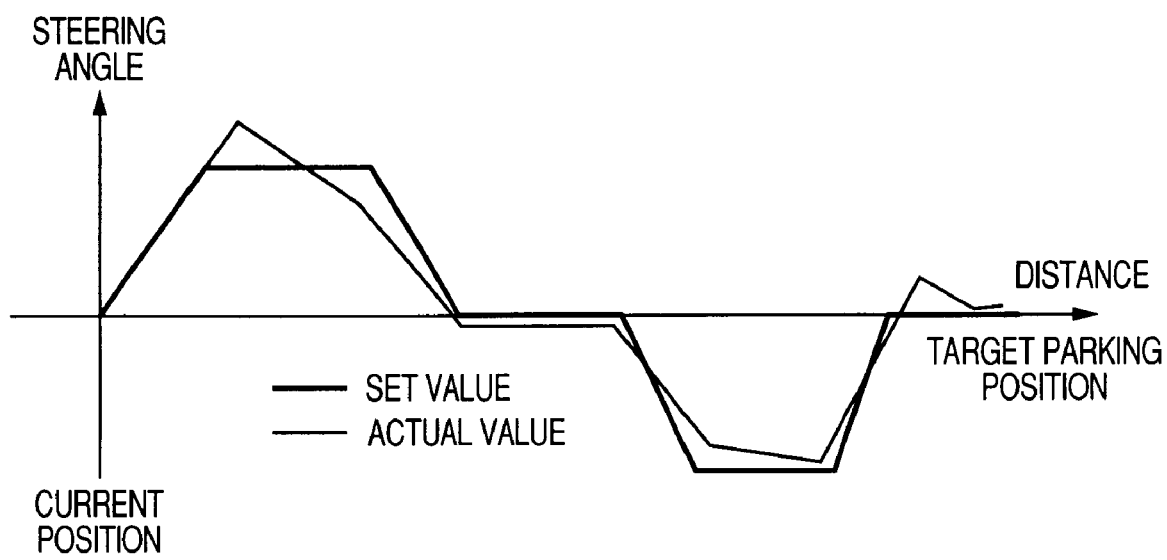
FIG. 8 is a graph which describes another automatic parking control by the automatic parking controller 22.

FIG. 8 is a graph which illustrates another automatic parking control by the automatic parking controller 22. In FIG. 8, an axis of ordinates represents the steering angle, while an axis of abscissas represents the traveling distance of the vehicle.

In the automatic parking controller 22, as shown by a thick solid line in FIG. 8, a relationship between steering angle and distance from a current position to a target parking position of the vehicle is set as a set value. In addition, at the time of automatic parking mode, the electric motor M is activated to operate via the driving circuit 30 and is then controlled so as to obtain a steering angle according to a traveling distance in such a way as to follow the set value set in FIG. 8. During this control, in the event that the driver operates the steering wheel 5 to result in a steering angle which differs from the steering angle set, a difference between the set steering angle and the actual steering angle (an actually measured value shown by a thin solid line) is obtained, so as to produce a guidance torque which is a constant multiple of the difference between the set steering angle and the actual steering angle for use in an intervention in the operation by the driver, whereby the driver is advised to operate the steering wheel 5 in such a way as to realize a steering angle which follows a set steering angle locus. More specifically, the guidance torque is produced in such a way that a small steering torque is felt by the driver when he or she operates the steering wheel 5 in a direction in which a resulting steering angle approaches the set steering angle, whereas a large steering torque is felt when he or she operates the steering wheel 5 in a direction in which a resulting steering angle moves away from the set steering angle. The production of the guidance torque is, of course, implemented by causing the electric motor M to operate via the driving circuit 30.

As a result, in the automatic parking mode, the driver is enabled to operate the steering wheel 5 with a steering feeling in which the state of the steering angle indicated by the thick solid line in FIG. 8 is felt as neutral. Namely, while the steering angle is automatically controlled by the automatic parking controller 22 in such a way that the vehicle travels along a running path set in advance, the steering feeling felt by the driver can be made to be such that with the steering angle which is automatically controlled made to be a neutral point, the steering wheel 5 is operated about the neutral point as required.

In addition, the constant corresponding to a difference between a set turning angle value of a turning pattern which follows a path set according to a traveling distance and an actual turning angle value may be constant or may be variable depending on the value of the turning angle difference.

In an example to which the embodiment is applied more appropriately, in the event that a set path and a vehicle running path deviate from each other by a certain threshold or more when the automatic parking control is started in the automatic parking mode, a set path is re-operated or reset towards the target parking position, so that the automatic parking mode is allowed to continue without being disrupted. As this occurs, the driver may be made to be aware that the steering angle is deviating from the set value by generating a warning sound or displaying a warning on the display unit.

In addition, when the automatic parking mode is put into effect, a positional relationship between the own vehicle and a vehicle parked to the side thereof is obtained from the camera 14, a distance sensor or the like, so that whether or not operation of the steering wheel 5 by the driver brings the subject vehicle into contact with the vehicle parked to the side thereof is determined at all times, and in the event that the contact looks like occurring, the driver may be made to be warned to avoid the contact by generating a warning sound or displaying a warning on the display unit.

While in the embodiment, the invention is described as being applied to the electric power steering system, the invention can be widely applied to vehicle steering systems in which a steering actuator is provided for imparting a steering force to a steering mechanism of a vehicle. These vehicle steering systems include a so-called steer-by-wire system, a hydraulic power steering system and the like. The steer-by-wire system means a system in which a mechanical connection between a control member such as a steering wheel or the like is eliminated, so that a manipulating amount of the control member is detected by a sensor and a driving force of a steering actuator which is controlled according to an output from the sensor is transmitted to the steering mechanism. In the steer-by-wire system, although the control member does not necessarily have to be linked with the steering mechanism during automatic parking control, in order to associate the position (for example, the steering angle of the steering wheel) of the control member which results when the automatic steering control is cancelled with the position of the steering mechanism (the steering angle), the control member is preferably operated so as to be linked with the steering mechanism even during automatic steering control.

In addition, while in this embodiment, the automatic parking control is raised as the example of the automatic steering control, this invention can also be applied to another type of automatic steering control such as an automatic steering control for enabling the vehicle to automatically run along a driving lane.

The embodiments described above are to be regard as illustrative rather than restrictive. Variations and changes may be made by others, and equivalents employed, without departing from spirit of the present invention. Accordingly, it is intended that all variations, changes and equivalents which fall within the spirit and scope of the present invention as defined in the claims be embraced thereby.

What is claimed is:

1. A vehicle steering system comprising:
 a steering actuator that gives a steering force to a steering mechanism of a vehicle; and
 an automatic steering controller that controls the steering actuator to perform automatic steering control,
 wherein the steering actuator includes an electric motor having windings of at least three phases;
 wherein the automatic steering controller executes the automatic steering control of the steering actuator by controlling a phase current by casing a PWM duty of a certain phase to become 100% according to an electrical angle of a rotor of the motor and applying an inter-phase voltage with employing an upper limit voltage as a reference; and
 wherein the automatic steering control differs from a steering assist control executed by the automatic steering controller at the time of manual steering.

2. The vehicle steering system according to claim 1 further comprising a setting switch which is manually operated to set the automatic steering control,
 wherein a control by the automatic steering controller is executed as a result of the automatic steering control being set by the setting switch.

* * * * *